US008165280B1

(12) United States Patent
Robbins

(10) Patent No.: US 8,165,280 B1
(45) Date of Patent: Apr. 24, 2012

(54) METHOD AND SYSTEM FOR PROVIDING BUSY OVERRIDE SERVICE IN A SIP-BASED NETWORK

(75) Inventor: David C Robbins, Grafton, MA (US)

(73) Assignee: Verizon Services Organization Inc., Irving, TX (US)

( * ) Notice: Subject to any disclaimer, the term of this patent is extended or adjusted under 35 U.S.C. 154(b) by 0 days.

(21) Appl. No.: 11/534,291

(22) Filed: Sep. 22, 2006

Related U.S. Application Data

(60) Provisional application No. 60/719,465, filed on Sep. 22, 2005.

(51) Int. Cl.
*H04M 3/42* (2006.01)
(52) U.S. Cl. .......... 379/208.01; 379/207.01; 379/202.01
(58) Field of Classification Search .......... 370/352; 379/265.02, 233, 235, 266.01, 202.01, 207.01–208.01
See application file for complete search history.

(56) References Cited

U.S. PATENT DOCUMENTS

| | | |
|---|---|---|
| 3,737,587 A | 6/1973 | Romero |
| 4,154,987 A | 5/1979 | Rosenberg et al. |
| 4,528,424 A | 7/1985 | Middleton et al. |
| 4,723,271 A | 2/1988 | Grundtisch |
| 4,741,024 A | 4/1988 | Del Monte et al. |
| 4,950,011 A | 8/1990 | Borcea et al. |
| 5,165,095 A | 11/1992 | Borcherding |
| 5,323,444 A | 6/1994 | Ertz et al. |
| 5,471,519 A | 11/1995 | Howe et al. |
| 5,619,561 A * | 4/1997 | Reese ................ 379/142.08 |
| 5,815,550 A | 9/1998 | Miller |
| 5,835,570 A | 11/1998 | Wattenbarger |
| 5,913,166 A | 6/1999 | Buttitta et al. |
| 5,970,134 A | 10/1999 | Highland et al. |
| 5,999,610 A | 12/1999 | Lin et al. |
| 6,021,176 A | 2/2000 | McKendry et al. |
| 6,026,156 A | 2/2000 | Epler et al. |
| 6,031,896 A | 2/2000 | Gardell et al. |
| 6,072,865 A | 6/2000 | Haber et al. |
| 6,208,726 B1 * | 3/2001 | Bansal et al. ............ 379/208.01 |
| 6,219,414 B1 | 4/2001 | Maciejewski et al. |
| 6,337,898 B1 | 1/2002 | Gordon |
| 6,339,639 B1 | 1/2002 | Henderson |
| 6,404,876 B1 | 6/2002 | Smith et al. |
| 6,484,196 B1 * | 11/2002 | Maurille ................ 709/206 |
| 6,510,315 B1 | 1/2003 | Arnson |
| 6,636,594 B1 | 10/2003 | Oran |
| 6,735,295 B1 | 5/2004 | Brennan et al. |
| 6,741,695 B1 | 5/2004 | McConnell et al. |
| 6,744,877 B1 | 6/2004 | Edwards |
| 6,754,325 B1 | 6/2004 | Silver et al. |
| 6,801,604 B2 | 10/2004 | Maes et al. |

(Continued)

OTHER PUBLICATIONS www.carrollcommunications.com/ipoffice/5donotdisturb.html, p. 1 of 2.*

(Continued)

*Primary Examiner* — Rasha S Al Aubaidi

(57) ABSTRACT

A method and system of an embodiment of the present invention may include sending an override signal to a first user wherein the first user is having a first dialog with a second user; establishing a second dialog with the first user; receiving a signal from the second user; and establishing a third dialog with the second user, in response to the signal, wherein the first dialog is terminated after the third dialog is established.

14 Claims, 5 Drawing Sheets

U.S. PATENT DOCUMENTS

| | | |
|---|---|---|
| 6,807,259 B1 | 10/2004 | Patel et al. |
| 6,834,048 B1 | 12/2004 | Cho et al. |
| 6,856,616 B1* | 2/2005 | Schuster et al. ............. 370/352 |
| 6,857,072 B1* | 2/2005 | Schuster et al. ............. 713/160 |
| 6,870,830 B1* | 3/2005 | Schuster et al. ............. 370/352 |
| 6,876,632 B1 | 4/2005 | Takeda |
| 6,879,673 B2* | 4/2005 | Creamer et al. ......... 379/207.01 |
| 6,954,521 B2 | 10/2005 | Bull et al. |
| 6,954,524 B2 | 10/2005 | Gibson |
| 6,961,332 B1 | 11/2005 | Li et al. |
| 6,963,633 B1 | 11/2005 | Diede et al. |
| 6,996,605 B2 | 2/2006 | Low et al. |
| 7,020,130 B2 | 3/2006 | Krause et al. |
| 7,031,700 B1 | 4/2006 | Weaver et al. |
| 7,082,193 B2 | 7/2006 | Barclay et al. |
| 7,085,253 B2 | 8/2006 | Yang |
| 7,130,282 B2 | 10/2006 | Black |
| 7,145,997 B2 | 12/2006 | Poikselka et al. |
| 7,203,293 B1 | 4/2007 | Bedingfield |
| 7,224,792 B2 | 5/2007 | Fusco |
| 7,257,837 B2 | 8/2007 | Xu et al. |
| 7,260,201 B2 | 8/2007 | Jorasch et al. |
| 7,274,662 B1 | 9/2007 | Kalmanek et al. |
| 7,283,517 B2 | 10/2007 | Yan et al. |
| 7,290,288 B2 | 10/2007 | Gregg et al. |
| 7,295,577 B2 | 11/2007 | Moody et al. |
| 7,301,913 B2 | 11/2007 | Corrao et al. |
| 7,406,696 B2 | 7/2008 | Burger et al. |
| 7,426,265 B2 | 9/2008 | Chen et al. |
| 7,440,440 B1 | 10/2008 | Abichandani et al. |
| 7,460,657 B1 | 12/2008 | Baeza |
| 7,489,771 B2 | 2/2009 | McMurry et al. |
| 7,580,497 B2 | 8/2009 | Wang et al. |
| 7,593,389 B2 | 9/2009 | Vance |
| 7,599,355 B2 | 10/2009 | Sunstrum |
| 7,609,700 B1 | 10/2009 | Ying et al. |
| 7,609,706 B2 | 10/2009 | Scott et al. |
| 7,630,481 B2 | 12/2009 | Kafka |
| 7,715,413 B2 | 5/2010 | Vaziri et al. |
| 7,743,141 B2 | 6/2010 | Wang et al. |
| 7,773,581 B2 | 8/2010 | Punj et al. |
| 7,860,089 B2 | 12/2010 | Tripathi et al. |
| 2002/0038388 A1 | 3/2002 | Netter |
| 2002/0114318 A1 | 8/2002 | Rines |
| 2002/0131447 A1 | 9/2002 | Krishnamurthy et al. |
| 2002/0136359 A1 | 9/2002 | Stumer et al. |
| 2002/0136363 A1 | 9/2002 | Stumer et al. |
| 2002/0141548 A1 | 10/2002 | Boda |
| 2003/0028806 A1 | 2/2003 | Govindarajan et al. |
| 2003/0043992 A1 | 3/2003 | Wengrovitz |
| 2003/0088421 A1 | 5/2003 | Maes et al. |
| 2003/0231759 A1 | 12/2003 | Bedingfield, Sr. et al. |
| 2004/0030750 A1 | 2/2004 | Moore et al. |
| 2004/0051900 A1 | 3/2004 | Sagiya et al. |
| 2004/0082324 A1* | 4/2004 | Ayoub ........................ 455/422.1 |
| 2004/0090954 A1 | 5/2004 | Zhang et al. |
| 2004/0148395 A1 | 7/2004 | Schulzrinne |
| 2004/0207724 A1* | 10/2004 | Crouch et al. ............. 348/14.09 |
| 2004/0240656 A1 | 12/2004 | Poustchi |
| 2004/0249951 A1 | 12/2004 | Grabelsky et al. |
| 2004/0264406 A1 | 12/2004 | Pattenden et al. |
| 2005/0013421 A1 | 1/2005 | Chavez et al. |
| 2005/0043014 A1* | 2/2005 | Hodge ......................... 455/411 |
| 2005/0069104 A1 | 3/2005 | Hanson et al. |
| 2005/0078642 A1 | 4/2005 | Mayer et al. |
| 2005/0123104 A1 | 6/2005 | Bishop et al. |
| 2005/0129219 A1 | 6/2005 | Williamson |
| 2005/0147227 A1 | 7/2005 | Chervirala et al. |
| 2005/0190721 A1 | 9/2005 | Pershan |
| 2005/0193338 A1 | 9/2005 | Hawkins et al. |
| 2005/0195802 A1* | 9/2005 | Klein et al. .................. 370/352 |
| 2005/0201530 A1 | 9/2005 | Koch et al. |
| 2005/0213716 A1 | 9/2005 | Zhu et al. |
| 2005/0215243 A1 | 9/2005 | Black et al. |
| 2005/0226217 A1 | 10/2005 | Logemann et al. |
| 2005/0237978 A1 | 10/2005 | Segal |
| 2005/0249196 A1 | 11/2005 | Ansari et al. |
| 2005/0286466 A1 | 12/2005 | Tagg et al. |
| 2006/0033809 A1 | 2/2006 | Farley |
| 2006/0039389 A1* | 2/2006 | Burger et al. ................. 370/401 |
| 2006/0062210 A1 | 3/2006 | Dharanikota |
| 2006/0062251 A1 | 3/2006 | Lim et al. |
| 2006/0067300 A1 | 3/2006 | Poustchi et al. |
| 2006/0067504 A1 | 3/2006 | Goldman et al. |
| 2006/0140379 A1 | 6/2006 | Yamamoto et al. |
| 2006/0140380 A1 | 6/2006 | Croak et al. |
| 2006/0146737 A1* | 7/2006 | Ohrstrom Sandgren et al. ............................. 370/261 |
| 2006/0177030 A1* | 8/2006 | Rajagopalan et al. ... 379/142.07 |
| 2006/0177044 A1 | 8/2006 | O'Neil et al. |
| 2006/0178130 A1 | 8/2006 | Makrygiannis |
| 2006/0203986 A1 | 9/2006 | Gibson |
| 2006/0218283 A1* | 9/2006 | Jones et al. ................... 709/227 |
| 2006/0221176 A1 | 10/2006 | Di Pietro et al. |
| 2006/0251229 A1 | 11/2006 | Gorti et al. |
| 2006/0285533 A1 | 12/2006 | Divine et al. |
| 2006/0286984 A1 | 12/2006 | Bonner |
| 2007/0025270 A1 | 2/2007 | Sylvain |
| 2007/0058613 A1 | 3/2007 | Beckemeyer |
| 2007/0083658 A1 | 4/2007 | Hanna et al. |
| 2007/0092073 A1 | 4/2007 | Olshansky et al. |
| 2007/0111723 A1 | 5/2007 | Ahmed et al. |
| 2007/0143858 A1 | 6/2007 | Hearty |
| 2008/0049724 A1 | 2/2008 | Tsujino et al. |
| 2008/0126549 A1 | 5/2008 | Khanchandani et al. |

OTHER PUBLICATIONS www.cisco.com/en/U/s/products/sw/voicesw/ps556/products_administration_guide, pp. 3-5 of 26.*

Rosenberg et al. "RFC 3261, SIP: Session Initiation Protocol", The Internet Society, Jun. 2002.

Newton's Telecom Dictionary 22nd Edition, p. 829, Feb. 2006.

Sparks, "RFC 3515—The Session Initiation Protocol (SIP) Refer Method," The Internet Society, Apr. 2003.

Mahy et al., "RFC 3891—The Session Initiation Protocol (SIP) 'Replaces' Header," The Internet Society, Sep. 2004.

Mahy et al, "RFC 3911—The Session Initiation Protocol (SIP) 'Join' Header," The Internet Society, Oct. 2004.

Handley et al., "RFC 2327—SDP: Session Description Protocol," The Internet Society, Apr. 1998.

Schulzrinne et al., "RFC 1889—RTP: A Transport Protocol for Real-Time Applications," The Internet Society, Jan. 1996.

Schulzrinne et al., "RFC 2833—RTP Payload for DTMF Digits, Telephony Tones and Telephony Signals," The Internet Society, May 2000.

Mahy et al., "draft-ietf-sip-join-03—The Session Initiation Protocol (SIP) "Join" Header," The Internet Society, Feb. 2004.

Mahy et al., "draft-ietf-sipping-cc-framework-03—A Call Control and Multi-party usage framework for the Session Initiation Protocol (SIP)," The Internet Society, Oct. 27, 2003.

Rosenberg, "RFC 3311—The Session Initiation Protocol (SIP) Update Method," The Internet Society, Sep. 2002.

Rosenberg et al., "RFC 3262—Reliability of Provisional Responses in the Session Initiation Protocol (SIP)," The Internet Society, Jun. 2002.

Jennings et al., "RFC 3325—Private Extensions to the Session Initiation Protocol (SIP) for Asserted Identity within Trusted Networks," The Internet Society, Nov. 2002.

Harrington et al., "RFC 3411—An Architecture for Describing Simple Network Management Protocol (SNMP) Management Frameworks," The Internet Society, Dec. 2002.

Rosenberg et al., "RFC 3840—Indicating User Agent Capabilities in the Session Initiation Protocol (SIP)," The Internet Society, Aug. 2004.

Mahy, "RFC 3842—A Message Summary and Message Waiting Indication Event Package for the Session Initiation Protocol (SIP)," The Internet Society, Aug. 2004.

"SR-504: SPCS Capabilities and Features," Telcordia Technologies, Issue 1, Mar. 1996.

"SR-3065: LSSGR Guide," Telcordia Technologies, Issue 7, Aug. 2003.

Mahy et al., "draft-ietf-sip-replaces-05—The Session Initiation Protocol (SIP) "Replaces" Header," The Internet Society, Feb. 16, 2004.

Schulzrinne, "draft-ietf-sipping-sos-00—Emergency Services URI for the Session Initiation Protocol," The Internet Society, Feb. 8, 2004.

Rosenberg et al., "draft-ietf-sipping-dialog-package-04—An INVITE Initiated Dialog Event Package for the Session Initiation Protocol (SIP)," The Internet Society, Feb. 13, 2004.

Lingle et al., "draft-ietf-sip-mib-08—Management Information Base for Session Initiation Protocol (SIP)," The Internet Society, Jul. 16, 2004.

Johnston et al., "draft-ietf-sipping-cc-conferencing-04—Session Initiation Protocol Call Control—Conferencing for User Agents," The Internet Society, Jul. 18, 2004.

Sparks et al., "draft-ietf-sipping-cc-transfer-02—Session Initiation Protocol Call Control—Transfer," The Internet Society, Feb. 15, 2004.

Rosenberg et al., "draft-ietf-sipping-conference-package-04—A Session Initiation Protocol (SIP) Event Package for Conference State," The Internet Society, May 21, 2004.

Petrie, "draft-ietf-sipping-config-framework-04—A Framework for Session Initiation Protocol User Agent Profile Delivery," The Internet Society.

"GR-1298-CORE—AINGR: Switching Systems," Telcordia Technologies, Issue 6, Nov. 2000.

\* cited by examiner

METHOD AND SYSTEM FOR PROVIDING BUSY OVERRIDE SERVICE IN A SIP-BASED NETWORK

CROSS-REFERENCE TO RELATED APPLICATIONS

This patent application claims priority to U.S. Provisional Patent Application No. 60/719,465, filed Sep. 22, 2005, which is hereby incorporated by reference herein in its entirety.

BACKGROUND INFORMATION

Session Initiation Protocol (SIP) is a call control signaling protocol for Internet Protocol (IP) networks. SIP is designed to be device-agnostic—that is, it is intended to provide a highly flexible call signaling capability that is not tailored to the capabilities of any particular device. Analog telephone signaling, on the other hand, is device-specific and highly constrained because of the historical legacy of the services delivered to the device. As a result, many call features available in traditional analog telephone devices are not easily integrated in a SIP-based network.

BRIEF DESCRIPTION OF THE DRAWINGS

In order to facilitate a fuller understanding of the exemplary embodiments of the present inventions, reference is now made to the appended drawings. These drawings should not be construed as limiting, but are intended to be exemplary only.

DETAILED DESCRIPTION OF PREFERRED EMBODIMENTS

A system and process of an exemplary embodiment of the present invention provides a Busy Override service that allows a user to override a busy signal and create a conference with an already-established call. In addition, the user may leave the call, force one party out of the call and/or perform another action. An embodiment of the present invention may implement the Busy Override service using distributed SIP signaling.

Figure 1:
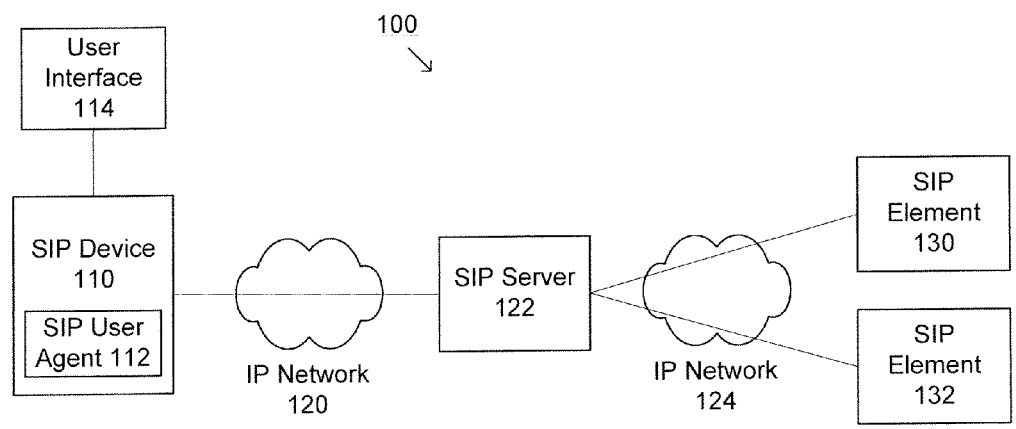
FIG. 1 is an exemplary SIP-based network system, according to an embodiment of the present invention.

FIG. 1 is an exemplary SIP-based network system, according to an embodiment of the present invention. System 100 illustrates an exemplary system for supporting SIP communication, in particular providing access to a SIP device based on a contact address associated with an invite request. As illustrated, SIP Device 110 may be coupled to User Interface 114. SIP Device 110 may include a SIP User Agent 112 for communicating across IP Network 120 to a SIP Server 122. SIP Server 122 may provide communication to other SIP devices, as shown by SIP Element 130 and SIP element 132, through IP Network 124. The various components of system 100 may be further duplicated, combined and/or integrated to support various applications and platforms. Additional elements may also be implemented in the system to support various applications. A SIP-based network may also include an IP network, packet switched based network or other type of network. The elements referred to in the Figures may include other network or packet switched based elements. For example, the elements referred to as "SIP" may include other network devices, elements, components, etc.

SIP Device 110 may represent a device that manages User Interface 114. User Interface 114 may include a traditional telephone and other data communication device using voice-band or other signaling, including but not limited to data modems, facsimile devices, teletype (TTY) equipment, etc. SIP Device 110 may contain SIP User Agent 112. SIP User Agent 112 may be integrated with SIP Device 110 or remote from SIP Device 110. SIP User Agent 112 may perform interworking between SIP signaling and user interface actions. For example, SIP User Agent 112 may manage an exchange of media (e.g., audio, etc.) between User Interface 114 and a Real Time Protocol (RTP) media stream of a media session set up by the SIP signaling. SIP Device 110 may originate calls to and receive calls from other users. SIP Device 110 may communicate through IP Network 120 to SIP Server 122. In addition, SIP Device 110 may include a Network Port N for communicating through IP Network 120 and an Audio Port P for communication with User Interface 114.

SIP Server 122 may represent a SIP proxy or application server that acts on behalf of SIP Device 110. For example, SIP Server 122 may manage a SIP Address of Record (AOR) on behalf of SIP Device 110. SIP Device 110 may register with SIP Server 122 and send SIP signaling through SIP Server 122 to other SIP elements, such as SIP Element 130 and SIP Element 132. For example, a call to the SIP AOR may be delivered to SIP Server 122, which in turn delivers the call to SIP Device 110. SIP Server 122 may perform some service on behalf of SIP Device 110, or may simply forward SIP messages to and from SIP Device 110. SIP Device 110 communicates through IP Network 124 to SIP Element 130 and/or SIP Element 132.

SIP Element 130 and SIP Element 132 may represent users with which the user of SIP Device 110 communicates. SIP Element may be a SIP Device, SIP Server, and/or other SIP enabled device. In addition, SIP Element may also represent a PSTN device that may be reached by a gateway that, directly or indirectly, acts as a SIP User Agent.

According to an embodiment of the present invention, SIP Device 110 may enable a user to override a busy signal and create a conference with an already-established call.

Figure 2:
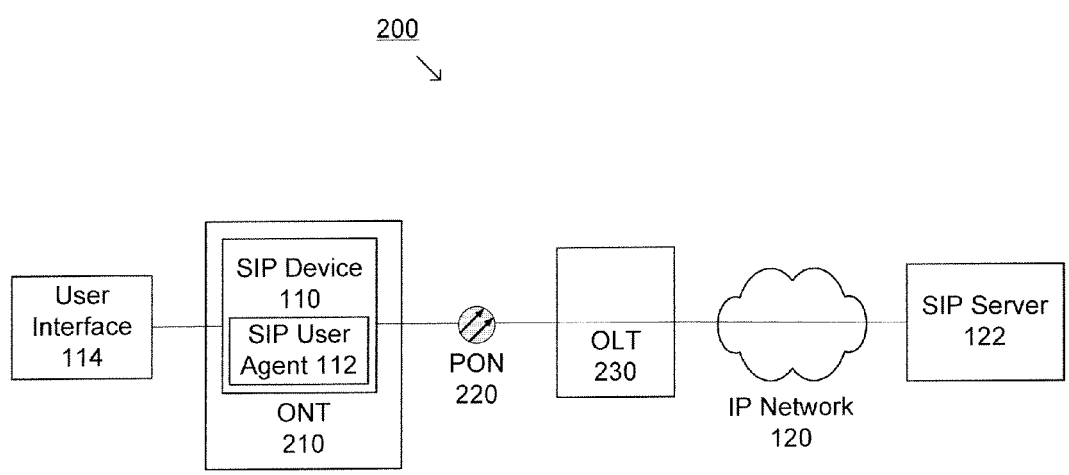
FIG. 2 illustrates an exemplary implementation where a SIP Device is embedded in a FTTP network, according to an embodiment of the present invention.
Figure 3:
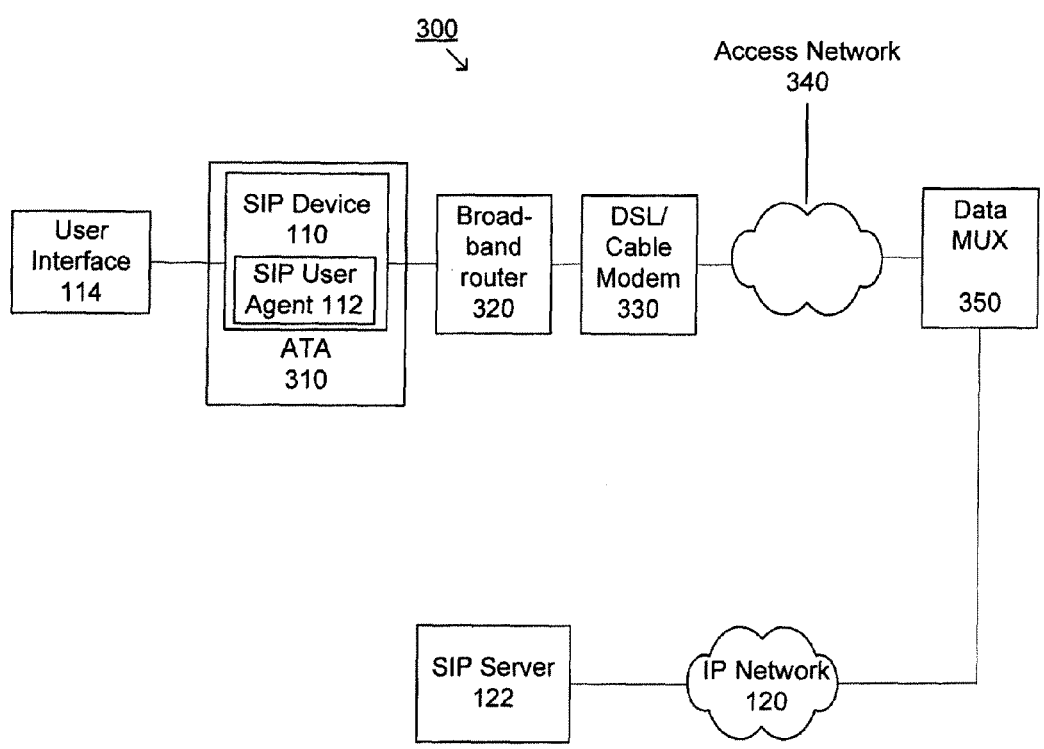
FIG. 3 illustrates an exemplary implementation where a SIP Device is embedded in an ATA device connected to an IP network, according to an embodiment of the present invention.

FIGS. 2 and 3 show exemplary implementations of a SIP Device. FIG. 2 illustrates an exemplary implementation where a SIP Device is used in connection with a Fiber-to-the-Premises (FTTP) network, according to an embodiment of the present invention. FIG. 3 illustrates an exemplary implementation where a SIP Device is embedded in an Analog Telephone Adapter (ATA) which is used in connection with a traditional (e.g., electrical) IP-enabled access network, according to an embodiment of the present invention. Other implementations with other devices and/or networks may also be realized.

As shown in FIG. 2, User Interface 114 may be connected to SIP Device 110. SIP Device 110 may be embedded in Optical Network Terminal (ONT) 210 or otherwise integrated. ONT 210 may be connected to an Optical Line Terminal (OLT) 230 via a Passive Optical Network (PON) 220 acting as an access network for communications between ONTs 210 and OLTs 230. According to an exemplary application, OLT 230 may be located at a Central Office. ONT 210 may be connected over PON 220 to the OLT 230, which in turn passes that connection through transport IP network 120 to SIP Server 122. According to an exemplary application, OLT 230 may maintain an IP connection between SIP Device 110 on the ONT 210 and the transport IP network 120. In this exemplary application, the OLT 230 may not process SIP signaling, but rather allows SIP signaling to pass through to its destination.

FIG. 3 illustrates SIP Device 110 embedded in an Analog Telephone Adapter (ATA) 310 in a home or other location that subscribes to a broadband service delivered via an access network, such as DSL or cable modem service. The ATA device may be attached to a network, such as a broadband data network, W network and/or other network. User Interface 114 may be connected to SIP Device 110. ATA 310 may be connected to Broadband Router 320, which in turn may be connected to a DSL or cable modem 330, which in turn may be connected to access network 340. Access network 340 may provide connectivity to transport IP network 120 through which the SIP Device 110 may communicate with SIP Server 122. In one example, as shown in FIG. 3, data multiplexer (MUX) 350 may provide a point of connection for transmissions between access network 340 and the transport IP network 120.

The various components of systems 200 and 300 as shown in FIGS. 2 and 3 may be further duplicated, combined and/or integrated to support various applications and platforms. Additional elements may also be implemented in the systems described above to support various applications.

In an Internet Protocol (IP) network using the Session Initiation Protocol (SIP) for voice call control signaling, it may be desired to provide a Busy Override service using peer-to-peer distributed SIP signaling and further deliver the service to a user interface. According to an embodiment of the present invention, the Busy Override service allows a user to override a busy signal and create a conference with an already-established call. In addition, the user may leave the call, force one party out of the call and/or perform another action. An embodiment of the present invention may implement the Busy Override service using distributed SIP signaling, relying upon SIP standards and/or using capabilities that exist in a SIP User Agent that manages a device, such as a SIP-enabled device or connected to, for example, an existing analog device. An embodiment of the present invention may manipulate the SIP dialogs such that a conference is created with the overriding user as the controller so that the overriding user has the ability to perform various actions, such as drop a party. According to an embodiment of the present invention, the Busy Override service may be implemented by reusing mechanisms for a call transfer that may exist in the User Agent.

According to an embodiment of the present invention, a Busy Override service may provide users with certain privileges to break into a call and optionally to remove one party from that call. Other privileges and/or actions may also be available. For example, this feature may be implemented in a group environment where executive level users (e.g., supervisors, executives, team leader, security personnel, etc.) may have this privilege. In addition, certain users may be given this privilege based on circumstances (e.g., an emergency circumstance, etc.).

An exemplary application of an embodiment of the present invention may involve an overriding user initiating a communication with a first user where the first user's line is busy. The first user may be communicating with a second user. In this example, the overriding user may have privileges that entitle the user to invoke a busy override service. Other access to or assignment of this privilege may be provided to an overriding user. The overriding user may activate the Busy Override service by selecting a function key, dialing a code, voicing a command or performing some other action to invoke this service. For example, the overriding user may dial a service code that activates the Busy Override service, and then dial the number of the first user whose line is busy. The first user and/or the second user may receive an alert indication, which may be heard or viewed by the user(s). For example, the alert indication may include an alert signal (e.g., alert tone, audio file, voice signal, etc.). In addition, the alert indication may be viewed as an alert signal (e.g., light signal, text, etc.). Thereafter, the overriding user may be placed into a conference call with the first user and the second user. The overriding user may perform certain actions. For example, the overriding user may hang up and allow the original call to continue. In addition, the overriding user may perform a hookswitch flash (or other action) which may disconnect the second user thereby leaving the overriding user in a two-party call with the first user. According to another example, the overriding user may disconnect the first user thereby leaving the overriding user in a call with the second user. In addition, the overriding user may disconnect both users at the same time or sequentially.

The Public Switched Telephone Network (PSTN) is evolving from its legacy technology base of analog and time-division multiplex (TDM) transport and signaling to a technology base using Internet Protocol (IP) transport and signaling protocols. However, the IP-based network may continue to support legacy analog subscriber equipment (e.g., analog phones, faxes, modems). A mechanism for supporting analog equipment in the IP network may include a line media gateway deployed at the "edge" of the network, which uses IP signaling protocols that may be designed specifically for the gateway application. Gateway signaling protocols may operate at a relatively low level, and may thus easily support services, such as Busy Override, with respect to analog subscriber equipment.

As IP signaling reaches more edge devices, SIP may be implemented as a call control signaling protocol for analog subscriber devices. For example, SIP signaling may meet analog subscriber devices at devices such as Integrated Access Devices, Analog Telephone Adapters, and Optical Network Terminals. Such devices may manage one or more connections to analog devices, and contain SIP User Agents that perform the translation between the analog line signaling expected by such analog devices and SIP protocol messages. In addition, SIP may also replace gateway control protocols in line media gateways. In contrast with gateway control protocols, which may be described as device control protocols, SIP may be considered a relatively high-level call control protocol.

The implementation in SIP of services, such as Busy Override, that may use a hookswitch flash to signal call control events may be made difficult because SIP standards generally do not provide a way to transmit the flash from the device to a network-based application. SIP is intentionally device-agnostic, and the flash is a device-specific signal.

According to an embodiment of the present invention, implementation of the Busy Override service in SIP may rely on SIP standards, such as IETF SIP standards and/or proposed standards. For example, an exemplary implementation may rely on one or more of RFC 3261 as a baseline SIP standard, RFC 3515 which may define the REFER method, RFC 3891 which may define the "Replaces" header field, and/or RFC 3911 which may define the "Join" header field. Other standards may also be implemented in accordance with the various embodiments of the present invention.

Figure 4:
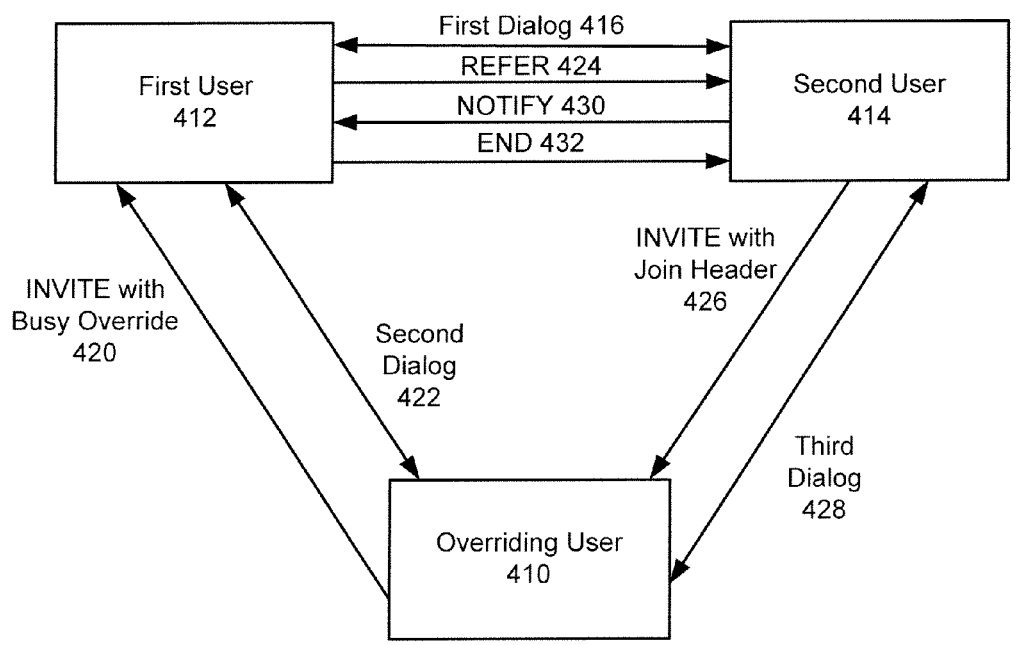
FIG. 4 is an exemplary illustration of a Busy Override implementation, according to an embodiment of the present invention.

FIG. 4 is an exemplary illustration of a Busy Override implementation, according to an embodiment of the present invention. First User 412 may communicate with Second User 414 through a First Dialog 416. Communication in FIG. 4 may be supported by an IP network and/or other packet switched network. In addition, other components, such as servers, routers and/or other devices may be implemented, as discussed above in connection with FIGS. 1, 2, and 3. Further, each user of FIG. 4 may represent a corresponding SIP device and/or SIP user agent (such as SIP Device 110 and SIP User Agent 112). Overriding User 410 may attempt to contact First User 412 while First User 412 is having an active call or engaged in some form of communication, as shown by First Dialog 416, with Second User 414. Overriding User 410 may send an INVITE request to First User 412. Because First User 412 is in a First Dialog 416, First User 412 may reply to the INVITE with a "486 Busy Here" response or other similar busy indicator, which may be presented to Overriding User 410 as a busy signal or other indicator. In response, Overriding User 410 may send a new INVITE request to First User 412 with a Busy Override service code or other indicator, as shown by 420. The Busy Override service code may be included as a prefix, appendix or other attachment to a destination address or other address.

First User 412 may recognize the Busy Override service code and establish a Second Dialog 422 with Overriding User 412. An alert tone or other indicator may be injected into an audio of a dialog, e.g., First Dialog 416. For example, this alert tone may be produced by First User 412 prior to establishing a Second Dialog 422. First User 412 may then send a REFER message 424 to Second User 414. The REFER message may include a "Refer-To" header field that specifies a contact address of Overriding User 410 and a "Join" header field with a Second Dialog 422 identifier. Other information may be included in the REFER message. The REFER message may create a subscription by First User 412 to the "REFER" event package in Second User 414, and Second User 414 may send a NOTIFY to First User 412 to indicate an establishment of the subscription.

Upon receipt of the REFER message, Second User 414 may send an INVITE message 426 to Overriding User 410, including a "Join" header field that specifies an identifier associated with Second Dialog 422.

Upon receipt of the INVITE message, Overriding User 410 may establish a Third Dialog 428 with Second User 414 and create a conference that includes the Second Dialog 422 and the Third Dialog 428. The conference may be locally mixed by Overriding User 410 or may be created in a conference server, which may be constructed using standard SIP mechanisms. Other implementations may be realized.

When Overriding User 410 accepts the INVITE message 426, a response (e.g., a 1xx or 2xx response) sent to Second User 414 may be included in the body of a NOTIFY message 430 sent from Second User 414 to First User 412, notifying First User 412 of the success of the REFER. Upon receipt of that NOTIFY message 430, First User 412 may end the first dialog, as shown by END 432.

At this point, all three users may be in a conference. Because the conference was "created" by Overriding User 410 (both dialogs include Overriding User 410), this user may be considered a controller of the conference. As the controller, Overriding User 410 has several options. For example, Overriding User 410 may drop out of the call, allowing First User 412 and Second User 414 to continue their conversation. In this scenario, Overriding User 410 may restore the original call, as shown by dialog 416, by sending a REFER message to First User 412, which may include a "Refer-To" header field that specifies a contact address of Second User 414 and a header parameter that specifies the "Replaces" header field with a dialog identifier for Third Dialog 428. The REFER message may implicitly create a subscription by Overriding User 410 to the "refer" event package in First User 412 and First User 412 may send a NOTIFY to Overriding User 410 to indicate the establishment of the subscription.

Upon receipt of the REFER message, First User 412 may send an INVITE message to Second User 414, including a "Replaces" header field that specifies a dialog identifier identifying Third Dialog 428. Upon receipt of the INVITE message, Second User 414 may establish a dialog with First User 412 and end the Third Dialog 428.

When Second User 414 accepts the INVITE E message, the response (e.g., a 1xx or 2xx response) sent to First User 412 may be included in the body of a NOTIFY message sent from First User 412 to Overriding User 410. As a result, Overriding User 410 may be notified of the success of the REFER. Upon receipt of that NOTIFY, Overriding User 410 may end Second Dialog 422 and is out of the call.

According to another example, Overriding User 410 may choose to force Second User 414 out of the call. In this example, First User 412 may perform a hookswitch flash (or other similar action). Because Overriding User 410 may be considered the controller of the conference, that action may be interpreted (e.g., by the SIP Device 110 and SIP User Agent 112 supporting Overriding User 410) as a request to drop the most recently added participant from the conference. Other functions may result from that action. Thus, Overriding User 410 may end the Third Dialog 428 and eliminate the conference, thereby leaving Second Dialog 422 active. According to another example, Overriding User 410 may force First User 410 out of the call.

While the illustrative examples involve three users, additional users may also be involved. For example, multiple users may participate in a multi-party conference call where one or more overriding users may invoke the Busy Override service, in accordance with the various embodiments of the present invention. In addition, multiple overriding users may invoke the busy override service to the same or different participants of various calls. The Busy Override service may be applied to calls as well as other forms of communication that involve an exchange or transmission of data between and/or among various users. For example, users may communicate via text message, instant messaging, video streams, sound files, etc. through various devices, such as mobile devices, computer interfaces, etc.

Figure 5:
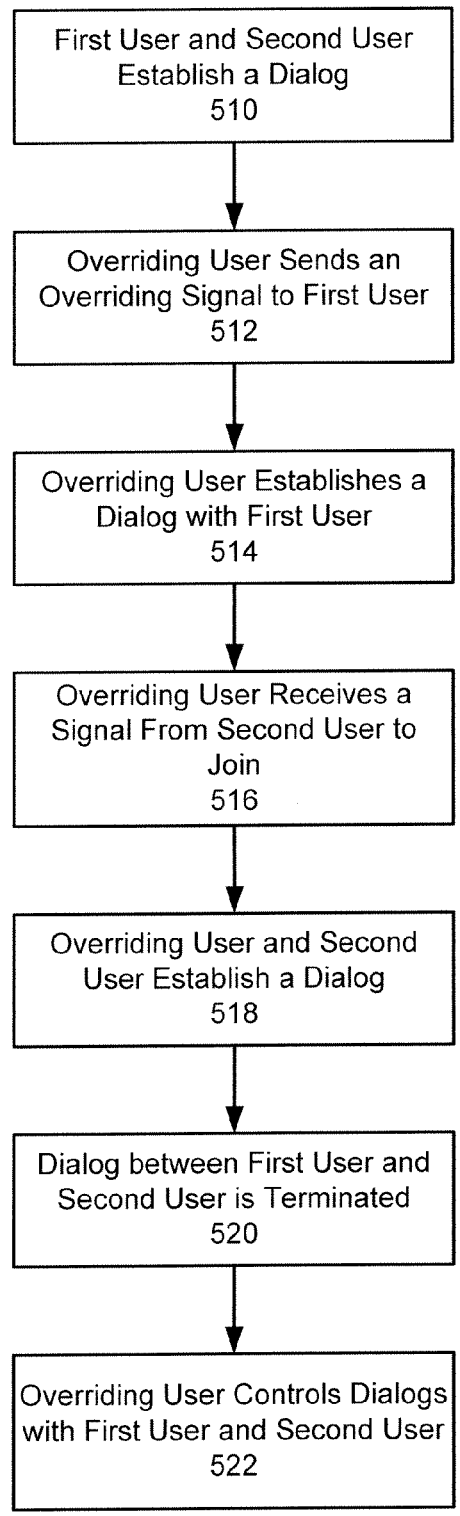
FIG. 5 is an exemplary flowchart illustrating a Busy Override process, according to an embodiment of the present invention.

FIG. 5 is an exemplary flowchart illustrating a Busy Override process, according to an embodiment of the present invention. At step 510, a first user and a second user may communicate through a first dialog. The first dialog may represent a communication involving an exchange of data between the first user and the second user. Other participants may be involved in the communication. At step 512, an overriding user may send an override signal to the first user. At step 514, a dialog may be established between the overriding user and the first user. At step 516, the overriding user may receive a signal from the second user to join the dialog between second user and the overriding user. At step 518, a dialog may be established between the overriding user and the second user. At step 520, the dialog between the first user and the second user may be terminated. At step 522, the overriding user may control the dialog with the first user and the dialog with the second user. For example, the overriding user may participate in the conference call, drop out of the call, force a user out of the call and/or perform other action.

An embodiment of the present invention for performing the Busy Override service may be implemented in SIP devices that provide conference and transfer services using a PSTN user interface. An embodiment of the present invention may implement standard SIP extensions and standard protocols thereby using existing SIP standards. By causing the conference to be created with the overriding user as the controller, an embodiment of the present invention requires minimal behavior to be implemented specifically for this service.

The behavior of the conference controller, e.g., Overriding User 410, may be a call transfer, as opposed to a three-way call. A transfer may, if the transferring user chooses, go through a stage where it is a three-way call before the transferring user gets out of the call and allows the transfer to complete. In contrast, on a three-way call, the entire call ends when the controlling party gets out of the call.

According to an embodiment of the present invention, the User Agent that becomes the controller of the conference may do so on receipt of or in response to an INVITE with a "Join" header field. The User Agent may recognize that this occurs in the context of a call that was initiated with the Busy Override service code as a prefix, appendix or other attachment. Therefore, the code may be interpreted as an indication that a transfer is taking place.

An embodiment of the present invention may provide the Busy Override service to a device that models an analog line, as the service exploits capabilities in place to support such devices. Further, an embodiment of the present invention may use a peer-to-peer, distributed call control to cause a conference to be created with the overriding user as the controller.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
sending, via a SIP device associated with an overriding user, an override signal to a SIP device associated with a first user wherein the first user is having a first dialog with a second user and the override signal includes at least one of a prefix of an address associated with the first user and an appendix of an address associated with the first user;
establishing a second dialog between the SIP device associated with the overriding user and the SIP device associated with the first user, wherein the SIP device associated with the first user sends a refer signal with contact information of the overriding user to the SIP device associated with the second user;
receiving, via the SIP device associated with the overriding user, an invite signal from a SIP device associated with the second user;
establishing a third dialog between the SIP device associated with the overriding user and the SIP device associated with the second user, in response to the invite signal, wherein the first dialog is terminated after the third dialog is established, wherein the second dialog and the third dialog are controlled by the overriding user, and wherein control by the overriding user comprises at least one of: participating in at least one of the second dialog and the third dialog, dropping out of at least one of the second dialog and the third dialog, forcing out at least one of the first user from the second dialog and the second user from the third dialog, and terminating at least of the second dialog and the third dialog.

2. The method of claim 1, wherein the override signal is sent in response to a busy condition.

3. The method of claim 1, wherein the invite signal comprises a message comprising a join header field.

4. The method of claim 1, further comprising terminating the third dialog with the second user.

5. The method of claim 1, further comprising terminating the second dialog with the first user.

6. A computer readable storage media for storing code for executing a computer process to perform the method of claim 1.

7. A system, comprising:
a device comprising a user agent configured to:
send an override signal to a first user wherein the first user is having a first dialog with a second user and the override signal includes at least one of a prefix of an address associated with the first user and an appendix of an address associated with the first user;
establish a second dialog with the first user;
receive an invite signal from the second user; and
establish a third dialog with the second user, in response to the invite signal sent by the second user based on a refer signal with contact information of the user agent from the first user, wherein the first dialog is terminated after the third dialog is established, wherein a refer signal is sent from the first user to the second user with a contact address of the user agent the third dialog with the second user, and wherein the second dialog and the third dialog are controlled by the user agent such that controlling the second dialog and the third dialog comprises at least one of: participating in at least one of the second dialog and the third dialog, dropping out of at least one of the second dialog and the third dialog, forcing out at least one of the first user from the second dialog and the second user from the third dialog, and terminating at least of the second dialog and the third dialog.

8. The system of claim 7, wherein the override signal is sent in response to a busy condition.

9. The system of claim 7, wherein the invite signal comprises a message comprising a join header field.

10. The system of claim 7, wherein the third dialog with the second user is terminated.

11. The system of claim 7, wherein the second dialog with the first user is terminated.

12. A method, comprising:
receiving, via a SIP device associated with a first user, an override signal from an overriding user while the first user is engaged in a first dialog with a second user and the override signal includes at least one of a prefix of an address associated with the first user and an appendix of an address associated with the first user;
establishing a second dialog between the SIP device associated with the first user and a SIP device associated with the overriding user; and
sending, via the SIP device associated with the first user, a message to the second user wherein the message comprises a contact address of the overriding user and an identifier identifying the first dialog;
wherein a third dialog is established between the SIP device associated with the second user and the SIP device associated with the overriding user based on the message, wherein the first dialog is terminated after the third dialog is established, wherein the second dialog and the third dialog are controlled by the overriding user, wherein control of the second dialog and the third dialog comprises at least one of: participating in at least one of the second dialog and the third dialog, dropping out of at least one of the second dialog and the third dialog, forcing out at least one of the first user from the second dialog and the second user from the third dialog, and terminating at least of the second dialog and the third dialog.

13. A computer readable storage media for storing code for executing a computer process to perform the method of claim 12.

14. A method, comprising:

sending, via a SIP device associated with an overriding user, an override signal to a SIP device associated with a first user wherein the first user is having a first dialog with a second user and the override signal includes at least one of a prefix of an address associated with the first user and an appendix of an address associated with the first user;

establishing a second dialog between the SIP device associated with the overriding user and the SIP device associated with the first user, wherein the SIP device associated with the first user sends a refer signal with contact information of the overriding user to the SIP device associated with the second user;

receiving, via the SIP device associated with the overriding user, an invite signal from the SIP device associated with the second user, wherein the invite signal includes a header field for identification of the second user;

establishing a third dialog between the SIP device associated with the overriding user and the SIP device associated with the second user, in response to the invite signal;

transmitting, via the SIP device associated with the overriding user, a response signal the second user; and controlling the second dialog and the third dialog, wherein controlling the second dialog and the third dialog comprises at least one of participating in the first dialog and the second dialog, and dropping and ending at least one of the first dialog and the second dialog.

* * * * *